INVENTOR
WILHELM RINDNER
BY Francis J. Thornton
ATTORNEY

INVENTOR
WILHELM RINDNER

BY Francis J. Thornton

ATTORNEY

INVENTOR
WILHELM RINDNER

BY Francis J. Thornton

ATTORNEY

INVENTOR
WILHELM RINDNER
BY Francis J. Thornton
ATTORNEY

INVENTOR
WILHELM RINDNER
BY Francis J. Thornton
ATTORNEY

STRAIN SENSITIVE BARRIER JUNCTION SEMICONDUCTOR DEVICE

Filed Feb. 26, 1963 8 Sheets-Sheet 6

INVENTOR
WILHELM RINDNER

BY Francis J. Thornton

ATTORNEY

INVENTOR
WILHELM RINDNER
BY Francis J. Thornton
ATTORNEY

STRAIN SENSITIVE BARRIER JUNCTION SEMICONDUCTOR DEVICE

Filed Feb. 26, 1963

8 Sheets-Sheet 8

INVENTOR
WILHELM RINDNER

BY Francis J. Thornton

ATTORNEY

United States Patent Office 3,403,307
Patented Sept. 24, 1968

3,403,307

STRAIN SENSITIVE BARRIER JUNCTION SEMICONDUCTOR DEVICE

Wilhelm Rindner, Lexington, Mass., assignor to Raytheon Company, Lexington, Mass., a corporation of Delaware Continuation-in-part of application Ser. No. 183,940, Mar. 30, 1962. This application Feb. 26, 1963, Ser. No. 261,065
13 Claims. (Cl. 317—235)

ABSTRACT OF THE DISCLOSURE

A semiconductor strain transducer which comprises a semiconductor element having at least two regions of different conductivity type separated by a barrier, one region having an exposed surface area relatively close-spaced to the barrier. A stylus having a small-radius point bears on the exposed surface for applying concentrated, nonuniform anisotropic stress to a small volume of the barrier.

This is a continuation-in-part of my copending application, Ser. No. 183,940, filed Mar. 30, 1962, and now abandoned.

This invention relates generally to semiconductor signal translating devices and methods of operation thereof, and particularly to semiconductor devices having a junction therein which devices are suitable for use as transducers.

The present invention sets forth a semiconductor signal translating device of new and improved form and is predicated on the discovery that non-uniform, concentrated, anisotropic stress on junctions can be detected and interpreted in terms of the current-voltage or reactance characteristics of such junctions.

The term "junction" in respect to the present invention is defined as a region of transition between semiconducting regions of different electrical properties, which definition was established by the IRE standards in October 1954 issue of the "Proceedings of the IRE."

Prior art devices utilize pressure applied over substantially the entire junction area of semiconductors having deeply embedded junctions. Such devices under best conditions were not effective as sensitive strain transducers. For example, prior art transducers required forces of about 80 grams to achieve a change in resistance of only 8 ohms.

The present invention sets forth a device that can achieve current changes in magnitude of, for example, as much as 4 orders when stresses corresponding to forces of only approximately 5 gram-weights are being applied and thus achieves changes in junction parameters by factors of the order of, for example, 10,000. Such an achievement is accomplished by locating the junction only slightly below the surface and subjecting a small portion thereof to a concentrated, non-uniform, anisotropic stress whereby such a radical change in the junction parameters is obtained. Such devices are readily adapted for use as strain transducers, phonograph cartridges, pressure gauges, microphones, temperature compensated semiconductor devices, variable gain semiconductor devices, three-terminal strain transducers and others.

Some of the prior art devices utilized a needle which was disposed in such a manner that the needle was to bear directly on the junction. However, such devices were inadequate in that an accurate determination of the location of the junction could not be made. Thus, the needle usually could not be made to bear on the junction itself but brought pressure to bear on the crystal on either side. The present invention overcomes this problem in that the needle-like structure can be brought to bear anywhere on the surface of the region overlying the junction and, preferably, perpendicularly to the plane of the junction. It is not required that the needle-like structure or stylus itself bear perpendicularly to the plane of the junction but it is required that, as a minimum, a component of the force applied be perpendicular to the plane of the barrier means or junction. The device of the present invention thus achieves an easily reproducible construction without the necessity of attempting to find the individual location of each junction as required by the described prior devices.

In one illustrative embodiment of this invention an electromechanical transducer comprises a body of semiconductor material having disposed only slightly below the surface thereof a rectifying barrier means such as a P–N junction, and a pair of electrical connections to the body on opposite sides of the junction, and an actuating member having a pointed end bearing against the surface of the body lying closest to the junction. The actuating member is so mounted as to apply concentrated, non-uniform, anisotropic stress on the junction when force is applied thereto. The variations in the stress result in corresponding changes in the resistance across the junction. The current flow has been found to change as the applied force is altered. It has further been found that the sensitivity of such a device increases as the junction is brought closer to the surface where the stress is being applied.

It has been found that other configurations in the actuating member may also be utilized. For example, instead of having a pointed end bearing on the surface, a wedge, knife edge or other such configuration may be utilized since anisotropic stress confined to a small volume of the junction is the essence of this invention. It should also be noted that although the embodiments described herein relate to germanium, other material, such as silicon, gallium arsenide or other semiconductor material may also be used.

The invention and the features thereof will be understood more clearly and fully from the following detailed description with reference to the accompanying drawings, in which.

Figure 4A:
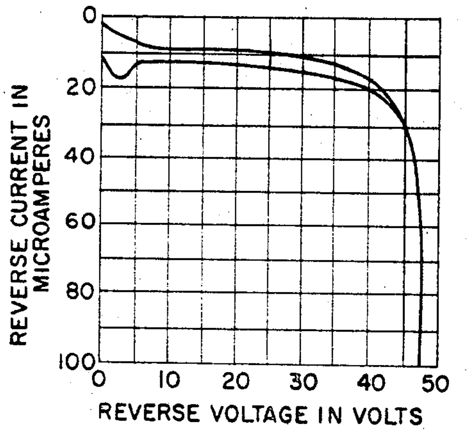
Figure 4B:
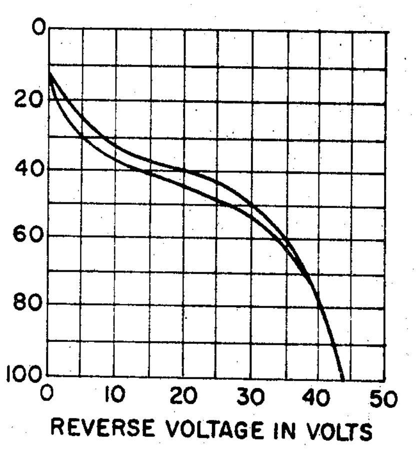
Figure 5:
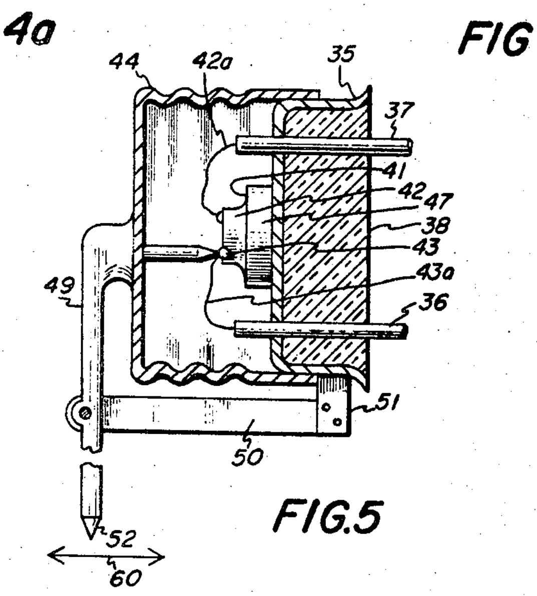
Figure 6:
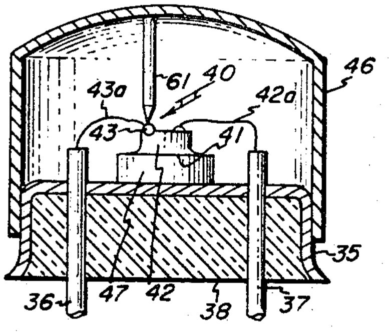
Figure 7A:
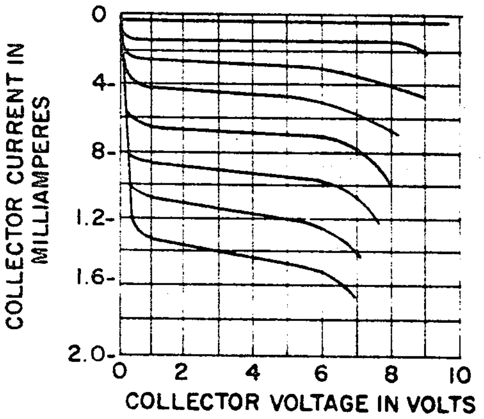
Figure 7B:
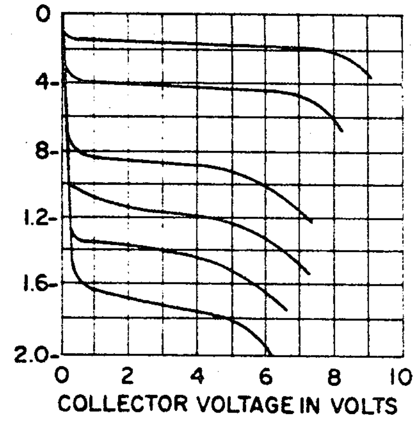
Figure 7C:
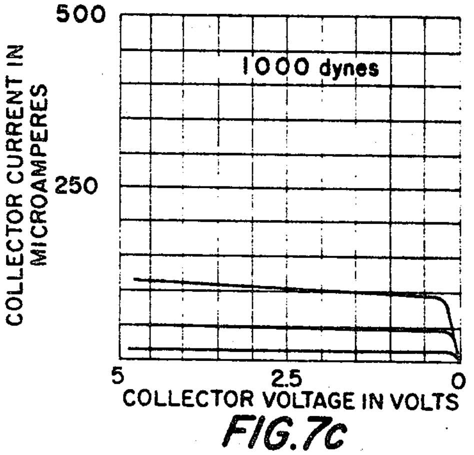
Figure 7D:
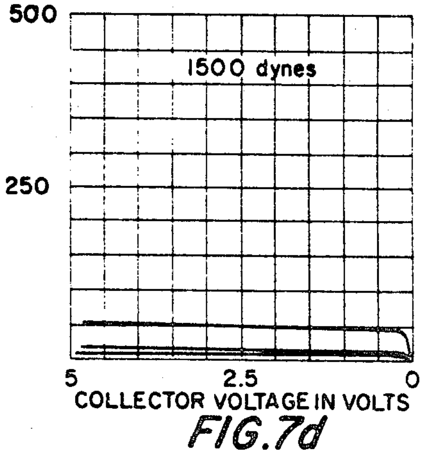
Figure 8A:
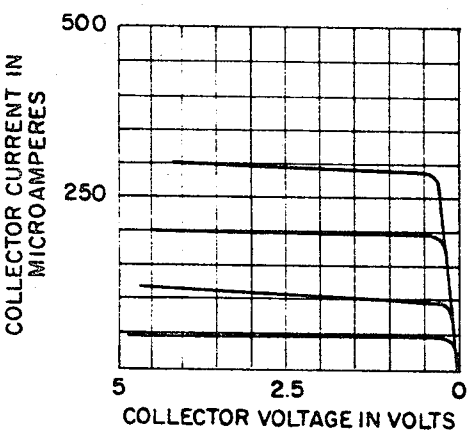
Figure 8B:
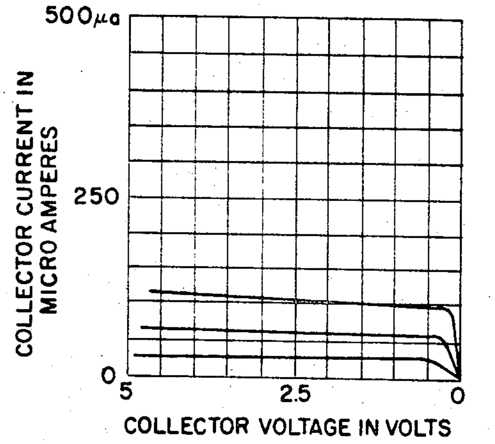
Figure 8C:
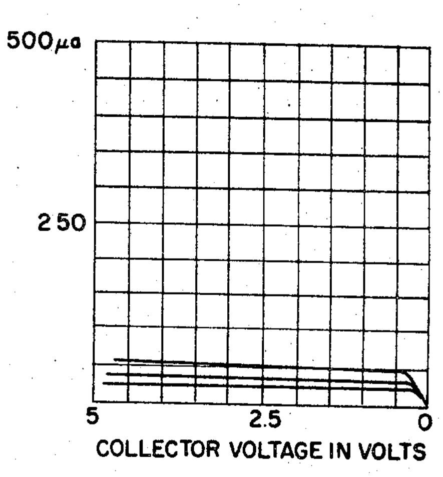
Figure 9:
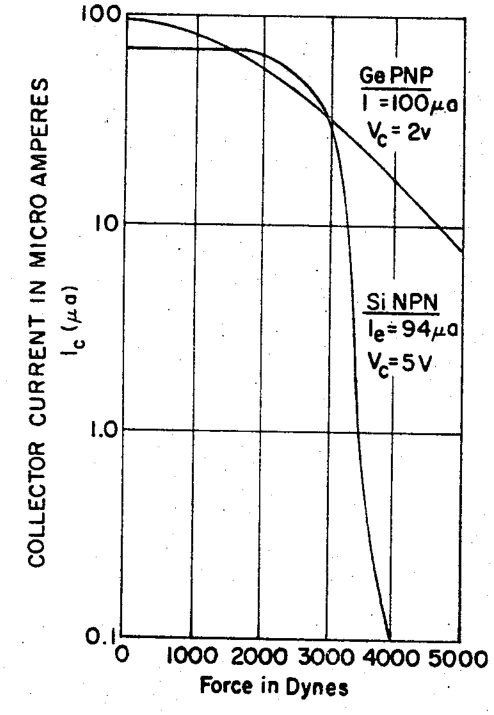
Figure 10A:
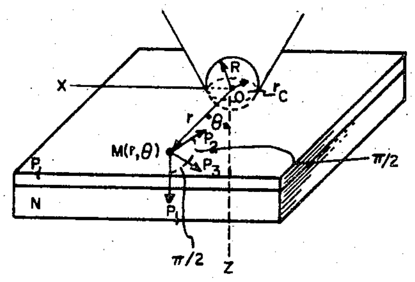
Figure 10B:
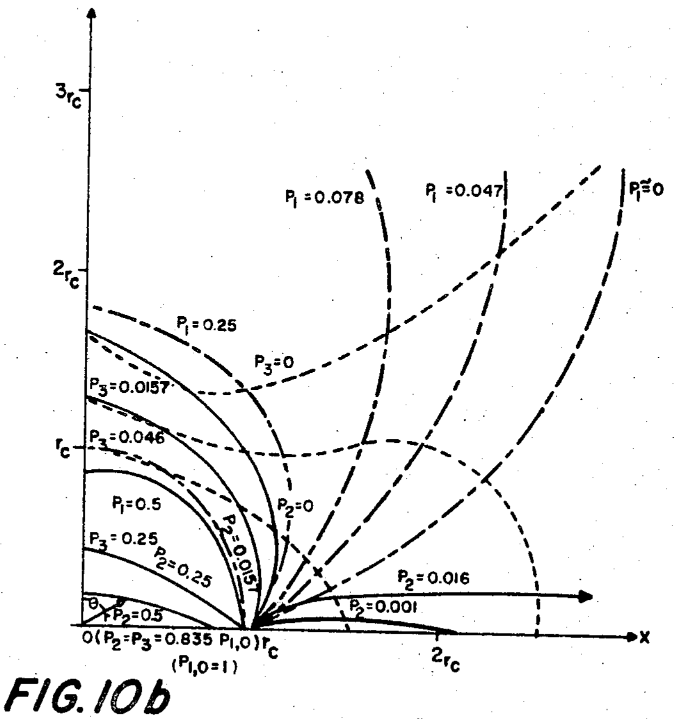
Figure 11:
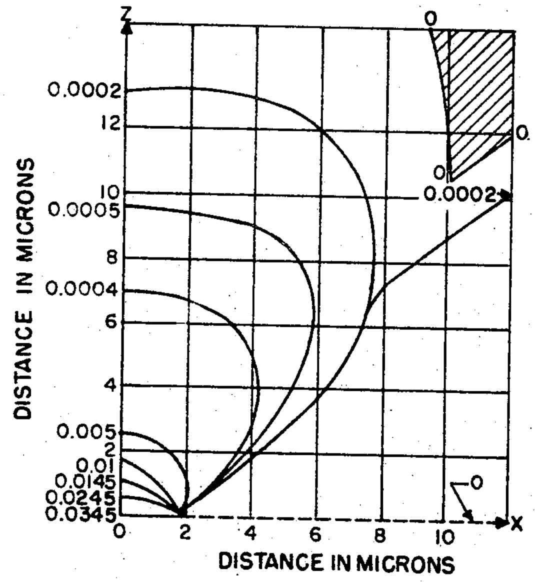
Figure 12:
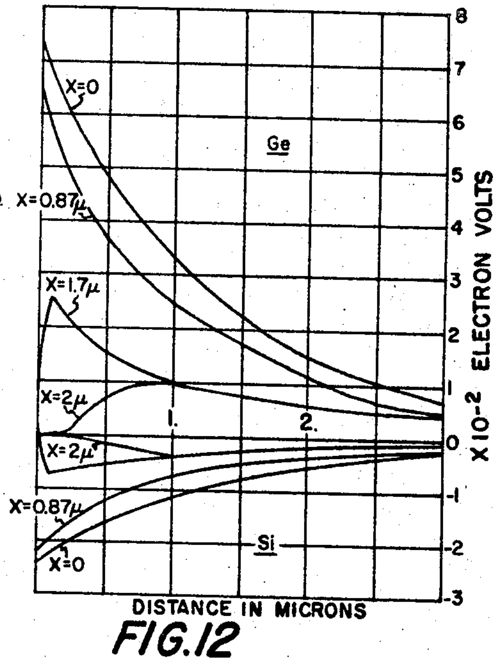
Figure 13:
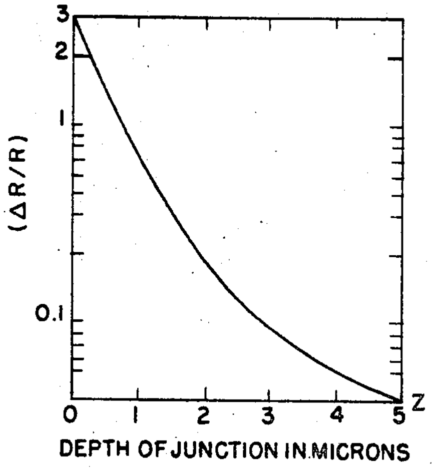
Figure 14:
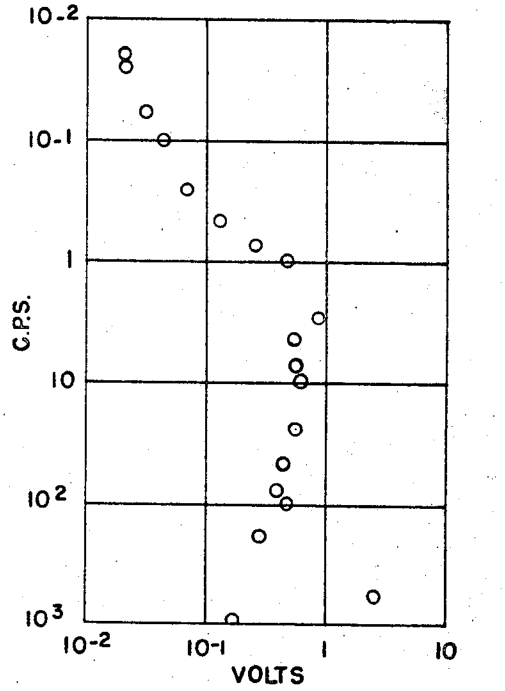
Figure 15:
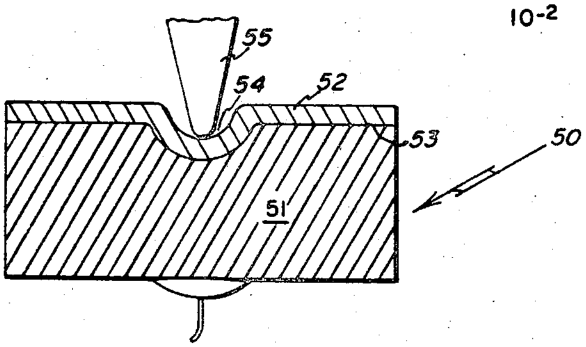
Figure 16B:
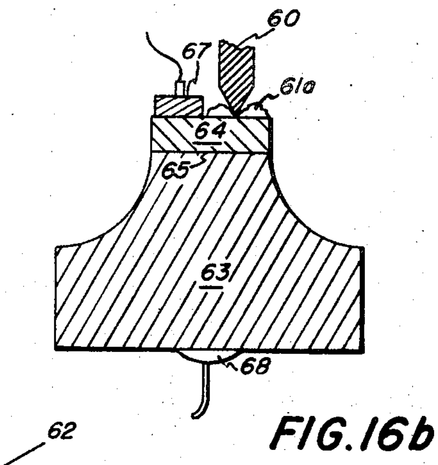
Figure 16A:
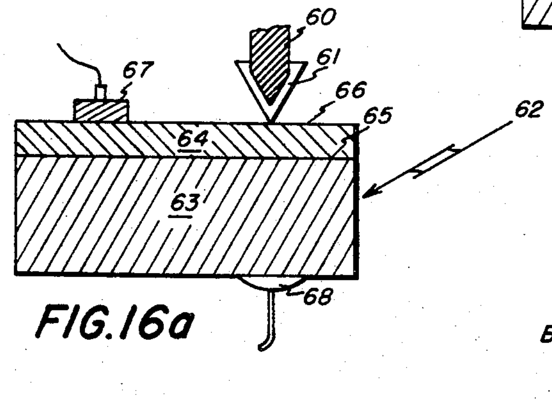
Figure 17:
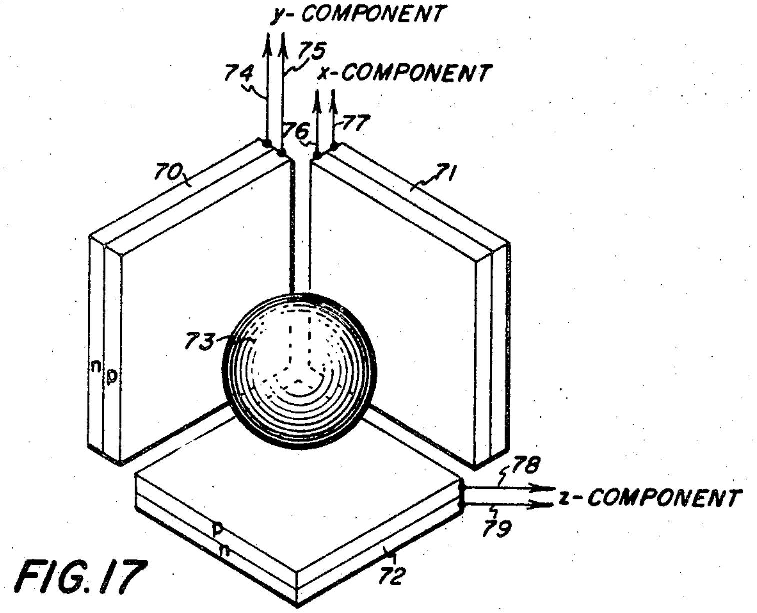
Figure 18:
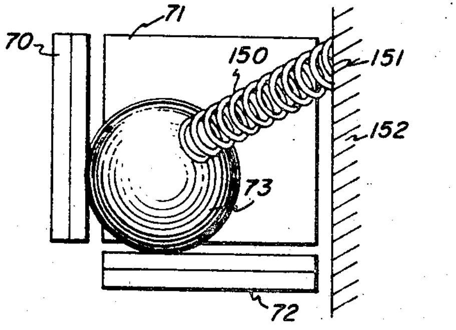
Figure 20:
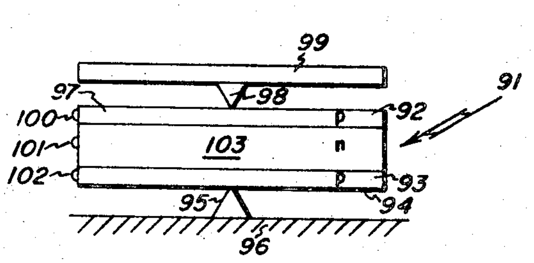
Figure 19:
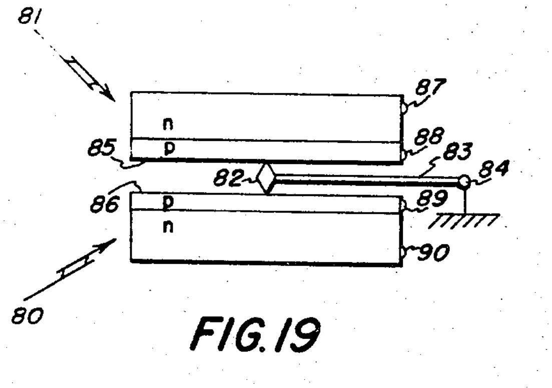
Figure 21:
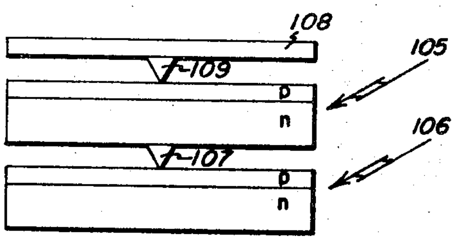
Figures 22, 23, 24, 25A, 25B:
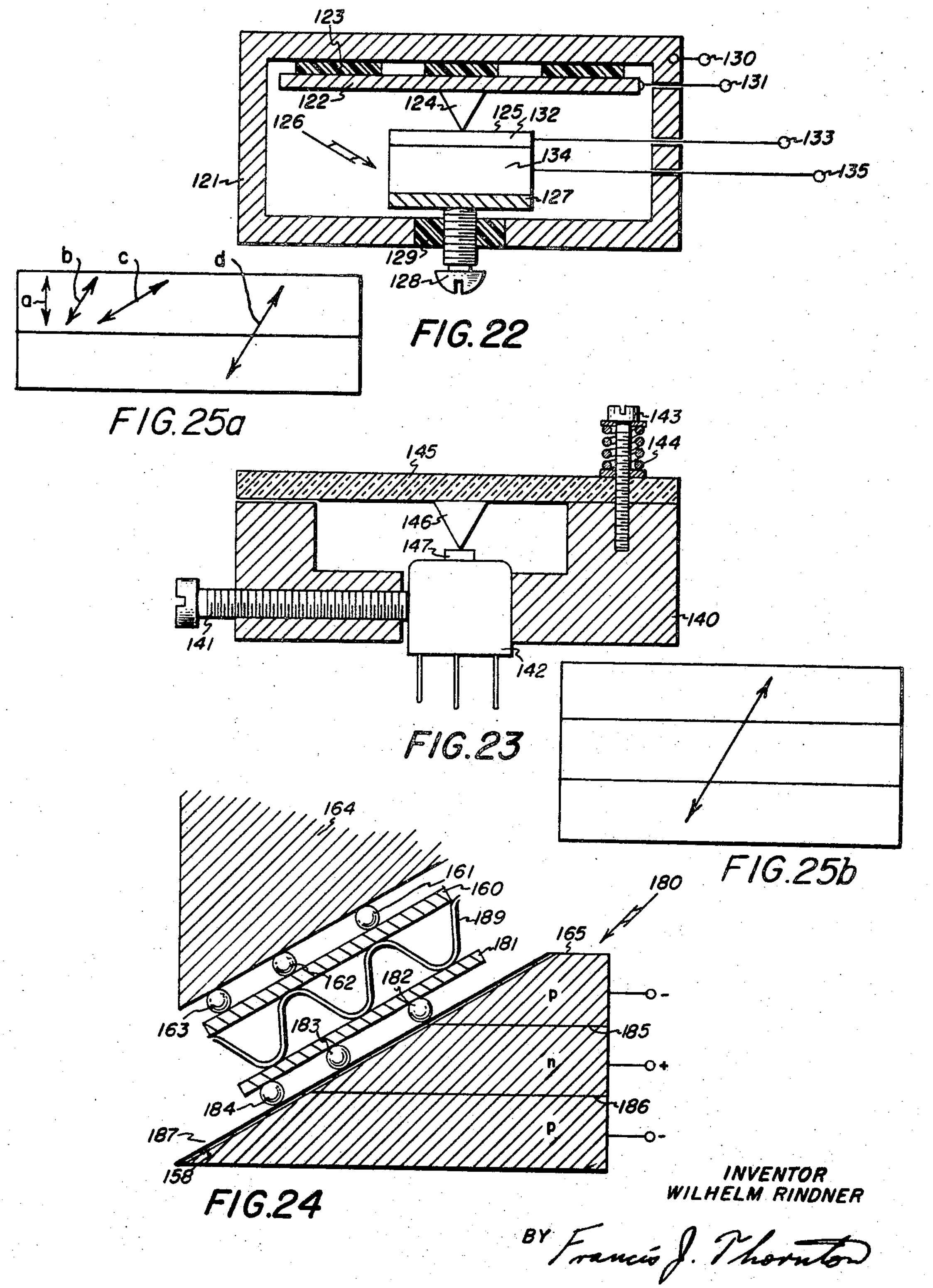

FIGS. 4*a* and 4*b* show the current-voltage characteristics of a germanium diode under varying pressures;

FIG. 5 shows a transistor structure utilized as a phonograph cartridge;

FIG. 6 shows a second embodiment of the invention utilized as a means of temperature compensating a transistor of temperature controlling the gain of a mesa transistor;

FIG. 7*a* shows the common emitter current transfer characteristics of the mesa transistor of FIG. 5 or FIG. 6 without strain;

FIG. 7*b* shows the common emitter transfer characteristics of the mesa transistor of FIGS. 5 or 6 with three grams pressing on the stylus introducing anisotropic stress in the emitter junction;

FIG. 7*c* shows the common emitter current transfer characteristics of a silicon mesa transistor of FIGS. 5 or 6 with the force of 1,000 dynes applied to the stylus;

FIG. 7*d* shows the common emitter current transfer characteristics of a silicon mesa transistor of FIGS. 5 or 6 with the force of 1,500 dynes applied to the stylus;

FIG. 8*a* shows the common emitter current transfer characteristics of a germanium mesa transistor without stress;

FIG. 8*b* shows the common emitter current transfer characteristics of a germanium mesa transistor with the force of 1,500 dynes applied to the stylus;

FIG. 8*c* shows the common emitter current transfer characteristics of a germanium mesa transistor with the force of 3,000 dynes applied to the stylus;

FIG. 9 is a graph of reversible change of collector current for constant emitter current for a silicon transistor and a germanium transistor both under a force of 4,000 dynes;

FIG. 10*a* shows an idealized and schematic representation of a stressing condition assuming purely elastic deformation;

FIG. 10*b* shows the magnitude of the principle stresses with the center of the contact radius of FIG. 10*a* as the origin of the coordinate system;

FIG. 11 shows the relative volume changes in any plane containing the Z-axis;

FIG. 12 is a plot of of the stress and anisotropy in the presence of large anisotropic electric fields in both germanium and silicon;

FIG. 13 is a plot of the local relative resistance change of a germanium junction as a function of its position along the *z*-axis;

FIG. 14 shows response of an output voltage across a load resistance of a device as a function of low stress frequencies;

FIG. 15 shows a sectional elevation view of an improved electromechanical transducer embodying the invention;

FIG. 16*a* shows one step of a fabrication technique of the invention;

FIG. 16*b* shows the completed device of which FIG. 9 was one step in the fabrication;

FIG. 17 shows a further embodiment of the invention utilized as an accelerator having three-dimensional resolution;

FIG. 18 is a side view of the accelerator shown in the isometric view of FIG. 17;

FIGS. 19, 20 and 21 show further embodiments of the invention utilized as push-pull and stacked strain transducers;

FIG. 22 shows still another embodiment of the invention which provides a four-terminal device having high input impedance;

FIG. 23 shows a transistor structure utilized as a microphone;

FIG. 24 shows a transistor structure utilized as a strain transducer which permits the application of overload without exceeding the elastic limit;

FIG. 25*a* shows the paths for the stressing spheres of FIG. 24 for a semiconductor diode having one junction therein; and FIG. 25*b* shows a transistor or three-level structure with a path thereon when utilized in the device of FIG. 24.

Figure 1:
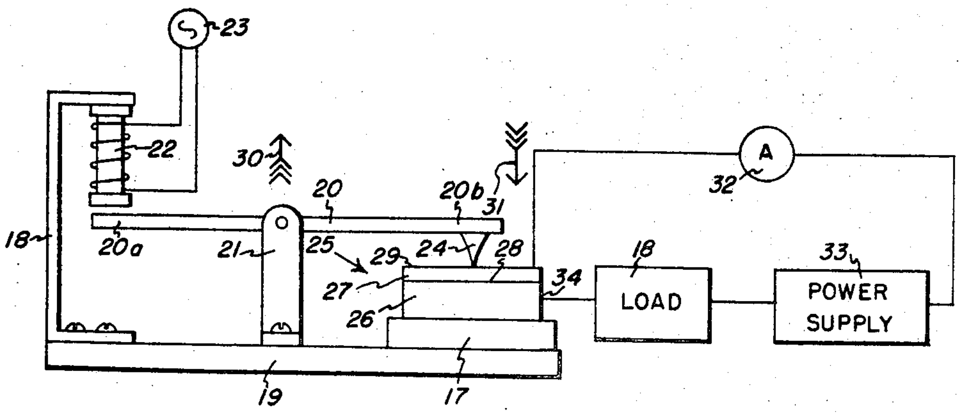
FIG. 1 is a sectional elevation view of an electromechanical transducer embodying this invention.

Shown schematically in FIG. 1 is an arm or bar member 20 pivotally supported on a bracket 21 which in turn is supported on a base 19. Also attached to base 19 by bracket 18 is an electromagnet 22 powered by a signal generator 23. The electromagnet 22 is maintained in a position directly over end portion **20*a* of arm 20. Carried by the underside of arm 20 near the opposite end 20*b* is a sharp stylus 24 pressing on a body of semiconductor material generally designated as 25 which is supported by a conventional means such as block 17 which in turn is supported by base 19. The body of semiconductor material 25 is shown as composed of a P region 26 and an N region 27, with a P-N junction 28 lying just slightly below surface 29. Stylus 24, which may be, for example, a standard sapphire phonograph needle, is positioned so that it bears on surface 29 perpendicular to the plane of the junction 28. It is to be noted that the stylus 24 does not necessarily have to bear perpendicular to the plane of junction 28 but may strike the surface 29** at an angle.

When the electromagnet 22 is energized, portion **20*a* of bar 20 is attracted upwardly, as indicated by the arrow 30, whereupon portion 20*b* of bar 20 carrying stylus 24 is forced downward, as shown by arrow 31, to force stylus 24 on surface 29 of body 25. Across body 25 there is supplied a power supply 33, which is connected between surface 29 of N-region 27 and surface 34 of P-region 26, through a measuring device 32, for example an ammeter, and through a load 18, for example a resistor, to reverse bias junction 28. The power supply 33 may be either a constant voltage or constant current supply. The device described may function adequately if biased in the reverse or forward direction. It is not necessary that junction 28 be operated only in the reverse direction. It has been found that as stylus 24 is brought to bear more and more strongly on surface 29, the current flowing across junction 28 increases in proportion to the amount of nonuniform, concentrated, anisotropic stress applied by stylus 24. Such increases in current may be detected by any measuring means such as the ammeter 32**.

Measurements of the response to stress frequencies up to several kcs. were performed, by simultaneous application of DC and AC to a stressing apparatus. Reverse bias was applied to the sample through a load resistor and the potentials across the resistor measured, while the frequency of the magnetic field was varied with an AC current of constant amplitude. Unavoidably, the results thus obtained are strongly influenced by the mechanical system involved and, by the same token, depend also on the stress bias, as well as on the junction structure used. Nevertheless, a typical result, as shown in FIG. 14, is indicative of response down to low frequencies. At high frequencies the response was measured on a hydrophone consisting essentially of a suitably stressed diode, and in this way response was obtained at frequencies up to about 100 kc.

The theory of operation of this device is not completely known; however, it is believed that the operation of this device is based primarily upon the reversible effect of stress on the generation and recombination of carriers within the crystal member and thus causes a current change across the junction.

The source of the greatest difficulty in the complete understanding of the described anisotropic stress effect, hereinafter known as ASE, is the strong stress anisotropy under which it has been observed. Thus, for a basis of discussion of the electrical phenomena at least a simplified description of the stress and stain fields is required. These fields are sufficiently similar in Ge and Si to permit the following calculations to be arbitrarily confined to Ge and to accept their validity for the present purpose also for Si.

A derivation of the stress field can be based on the general case of two spheres in elastic contact; as the radius of one sphere tends toward infinity the case which is presently of interest is approached. Elastic deformation leads to a circular contact area with a radius (FIG. 10*a*)

$$r_c = KF^{1/3} \tag{1}$$

where F is the applied force and K is a constant of proportionality which depends on Young's modulus E, and R, the radius of curvature. For the purpose of an estimate, isotropic and equal elastic properties of Ge and diamond are assumed. Using for Ge, $E=1.5\times10^{12}$ dynes cm.$^{-2}$, Poisson's ratio $\sigma=0.3$, and $R=20\mu$ leads to $K\simeq10^{-5}$ cm. dyne$^{-1/3}$.

The magnitude of the principal stresses $P_i$, is shown in FIG. 10*b* with the center of the contact radius $r=0$ as the origin of the coordinate system. The principal stresses are normalized with respect to the pressure $P_{1,0}$ at $r=0$ and the distances are normalized with respect to $r_c$. With the above assumptions $P_{1,0}$ can be shown to be given by $$P_{1,0}=\frac{3}{2\pi k^2}F^{1/3} \tag{2}$$

Using the same assumptions as in the derivation of the principal stresses, the relative volume changes follow from:

$$\frac{\Delta V}{V}=\sum_{i=1}^{3} e_i \tag{3}$$

where V is the volume, and $e_1$, $e_2$ and $e_3$ are the principal strains derived by Hooke's law from the following expressions:

$$\begin{aligned} e_1&=\frac{P_1}{E}-\frac{\sigma}{E}(P_2+P_3)\\ e_2&=\frac{P_2}{E}-\frac{\sigma}{E}(P_3+P_1)\\ e_3&=\frac{P_3}{E}-\frac{\sigma}{E}(P_1+P_2) \end{aligned} \tag{4}$$

Substitution of Equation 4 into Equation 3 leads to:

$$\frac{\Delta V}{V}=\frac{1}{E}(1-2\sigma)\sum_{i=1}^{3} P_i \tag{5}$$

Considering now, for greater clarity, typical experimental conditions with, say $R=20\mu$ and $F=3000$ dynes, Equations 1 and 2 lead to $r_c=1.74\mu$ and $P_{1,0}=4.74\times10^{10}$ dynes cm.$^{-2}$. These values are quite typical, and are illustrative of the high stress concentrations involved in this work. The relative volume changes in any plane containing the $z$-axis, for the above specific conditions, are plotted in FIG. 11. Within the shaded region $\Delta V/V\leq0$; however, except within a small region approximately equal to the contact area, $\Delta V/V$ is negligibly small. At $r=0$ the relative volume compression is of the order of 3.5 percent, indicating that contrary to the original assumption some plastic deformation takes place on the surface.

Considering the shallowness of the junctions used, the elastic deformation of the semiconductor under stress is far from negligible. Let, for example, R and F again assume the above values; then $$z=1.23\left(\frac{F}{E}\right)^{2/3}\times R^{-1/3} \tag{6}$$

the deformation at $r=0$ equals $0.16\mu$. This means that the deformation can be comparable or even equal to the depth of the junctions used.

There can be no doubt that band gap effects play an important role in the ASE. An estimate of the band gap conditions, disregarding for the moment the presence of a junction, can be made on the basis of a spherical energy surface from the expression $$\Delta E_g=\frac{E}{3}\frac{\Delta V}{V}\frac{\partial E_g}{\partial p} \tag{7}$$

where $\partial E_g/\partial p$ can be taken as $5\times10^{-12}$ e.v. dyne$^{-1}$ cm.$^2$ for Ge, and $-1.5\times10^{-12}$ e.v. dyne$^{-1}$ cm.$^2$ for Si. Using the previously described specific stress conditions, $\Delta E_g$, as derived from FIG. 17 and Equation 7, is plotted in FIG. 12 along four lines parallel to the $z$-axis at $x=0$, 0.87, 1.7, and $2\mu$, where $x$ is an arbitrary direction along the surface. These lines would pass through the center of the contact area ($x=0$), through the periphery of the contact area ($x=1.7\mu$) and through two points inside and outside the contact area, respectively. A very interesting consequence of the strain anisotropy manifested in FIG. 12 is the presence of very large and anisotropic electric fields in both Ge and Si. These fields are particularly strong in the vicinity of the surface, with large components both parallel and at right angles to the surface. To what extent these results are realistic depends, of course, on the initial assumption concerning the shape of the energy surfaces. However, at least, it is clear that the anisotropic stresses will introduce large variations and extrema in the energy gap.

It will be apparent from the preceding that the ASE involves a very complex physical situation with interacting mechanical and electrical phenomena. It is clear that ASE requires the presence of very high stresses, shows a strong dependence on junction depth, is present under both forward and reverse bias, is qualitatively roughly similar in various junctions profiles in Ge and in Si, is dependent on crystallographic orientation, has a frequency response from D-C to at least 100 kcs., and shows a strong temperature dependence, and, of course, that it manifests itself in various multiple junction configurations.

An examination of this list on the one hand, and a consideration of the calculated stress fields and their consequent electrical effects, very soon leads to the realization that the many facets of the ASE allow too much latitude for the formulation of an unambiguous model. Nevertheless, at this stage certain consistencies become apparent which may serve as a basis for tentative conclusions.

First some geometircal aspects: The discussion on reverse-bias junction resistance as a function of radius indicates that the anisotropy rather than the magnitude of the stress is of significance. For example, the reverse-bias junction resistance of a diffused Ge junction about $1\mu$ deep was measured as a function of the radius of curvature of the stressing stylus. The results relating $\Delta$I (current change due to stress) as a function of radius at a constant bias of 6 volts and under a constant force close to the elastic limit which was chosen in order to provide a meaningful reading with the large radii are as follows:

| | | | | |
|---|---|---|---|---|
| Radius ($\mu$) | 25 | 34 | 55 | 59 |
| I ($\mu$a.) | 48 | 14 | 0.6 | 0.5 |

By simple arithmetic, using Equation 1 and the values of $P_1$ from FIG. 10*b*, it can be shown that the pressure at the junction is only about twice as large for $R=25\mu$ than for $R=59\mu$, yet the response of the junction is about two orders of magnitude larger than in the latter case. This ratio is all the more significant since with the larger radius a larger junction volume is under pressure.

It is apparent that the effect is confined to a small region, probably of the order of the contact radius. If this is the case, then, whatever the basic mechanism, the question arises, whether the effect is only initiated by stress and whether a high consequent current density and heating could amplify a moderate initial effect. As far as heating is concerned, at least within a power range of say 1 mw., a rough estimate based on an expression for the temperature rise $\Delta T$ at point contacts of radius $r$ $$\Delta T=P/2\pi Kr \tag{8}$$

where P is the dissipated power and K the thermal conductivity, leads to a local temperature rise of less than 10° C. This then does not appear to be a major effect, and the experiments involving variations of duty cycle, as well as the high frequency response bear this out. These considerations obviously do not apply at the higher current levels and negative resistance effects may well be assisted or caused by heating.

One of the most striking features of the ASE is its strong dependence on the depth of the junction. The relatively slow increase of the depth of the indentation as the ⅔ power of force indicates that a gross distortion of planar junctions is particularly effective at very shallow depths of the order of $0.1\mu$. On the other hand, a comparison of the steep stress gradient and the strong decrease with depth of the ASE suggests a dominant physical mechanism operative directly at the junction level or within a diffusion length above it. This argument is also supported by the observation that stresses sufficient to affect the emitter junction but not large enough to affect the collector junction or to change reverse $\beta$ significantly, yet cause a large decrease in forward $\beta$.

Having spatially located the ASE and considering the shallowness of the junctions, particularly directly under the indentation, the role played by the semiconductor surface requires some consideration. That a trivial surface effect takes place by means of the indenting stylus can be ruled out by the observation that the ASE was essentially the same whether metallic or insulating styli were used. Nevertheless, surface effects cannot be ruled out entirely. Little is known about surface states under pressure and even under ordinary conditions there is a space charge due to these states which can extend to depths comparable to those of the junctions used.

Having briefly reviewed the more direct mechanical manifestations of the ASE, some of their electrical implications can be considered. An examination of the band structures calculated for the anisotropic stress conditions (FIG. 13), even with the reservations due to the assumptions involved, makes it evident that an analysis of the junction characteristics in terms of the conventional one-dimensional Shockley model would have very little meaning. In both Ge and Si, electric fields of considerable magnitude are set up near the surface, with extrema near the periphery of the contact radius. How the band gap variations connect up with the rest of the semiconductor and, particularly, with the barrier at the junction, is still a matter of speculation. The instabilities experienced with very shallow junctions ($\sim 0.1\mu$) whose depth is within the high field region may well be a consequence of breakdown effects and may, incidentally, constitute an ultimate limitation to the shallowness of junctions which could stably display the ASE.

A consequence of the high fields close to the junction suggests the possibility of field emission. It is, therefore, interesting to note that field emission as a tentative model to explain decreased junction resistance had been previously considered on the basis of arguments similar to those above; namely, by the creation of large band gap changes at local lattice strains due to dislocations. Such a model would essentially be compatible with all the manifestations of the ASE, except for its temperature dependence. Field emission has been shown to cause a current change of less than an order of magnitude over 78° K. to 300 K., and to cause the breakdown voltage to increase with decreasing temperature. Neither of these conditions is satisfied in the present case.

The bulk temperature dependence of the ASE was investigated in an ambient of silicone oil whose temperature was appropriately varied by electrical heating or by a surrounding dewar flask containing a cooling liquid. At any given temperature the I–V characteristics were meassured both unstressed and under stress. Generally, the measurements above room temperature led to more scatter in the experimental results than at lower temperatures.

It was found that in Si and in Ge, irrespective of the junction type and quality, ΔI increased with increasing temperature. The Si unit was stressed with about 8000 dynes and ΔI was measured to 0.5 v. forward, and 20 v. reverse bias. One Ge unit was subjected to 6000 dynes and ΔI was measured at 0.1 v. and 20 v. of forward and reverse bias, respectively. A second Ge unit was measured under 2700 dynes at a reverse bias of 3 v. The temperature dependences, even though arbitrarily defined, appear to follow exponential relationships and, as might be expected, the Si samples were less temperature-dependent than the Ge samples. Thus, compared with conventional devices utilizing the "piezo-resistive" effect known to the semiconductor art, the devices incorporating the ASE show larger outputs for a given stress with increasing temperature. The breakdown voltages in the Ge samples increased with temperature both in the absence as well as in the presence of stress.

The effect of local heating by the current flow through a junction under stress was investigated by displaying the I–V characteristic under pulsed conditions on an oscilloscope. By suitable adjustment of pulse width and repetition rate, the duty cycle was varied between 75 percent and 0.75 percent, while the junction was stressed with various forces. Within experimental error no change in the characteristics as a consequence of the variations in duty cycle could be detected.

In the above results it is tacitly assumed that the elastic properties of the semiconductor are independent of temperature. This assumption is well justified, in view of the very small changes of the elastic properties found in Ge and Si over the temperature range considered.

It is believed that some slight plastic deformation of the surface occurs under the stylus without deleterious effects on the reversibility of the electrical characteristics of the junction. It should be noted, however, that the slight plastic deformation thus described must not extend into the active region of the junction, for if it does, the electrical characteristics of the junction will be irreversibly altered.

Figure 2:
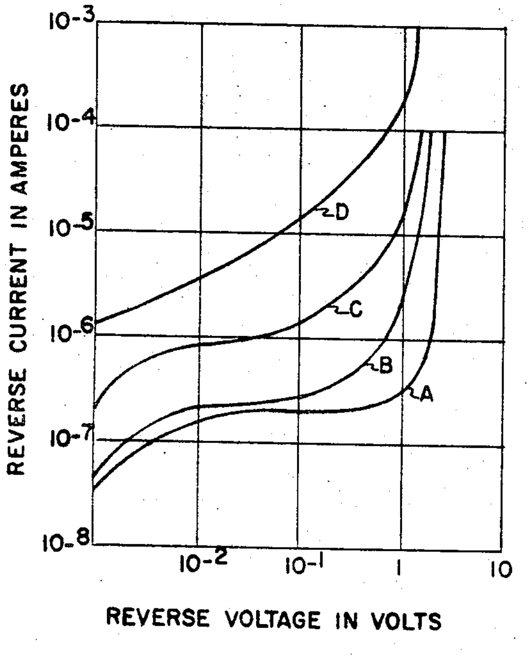
FIG. 2 is a graph of voltage and current of a P–N junction as a function of pressure.
Figure 3:
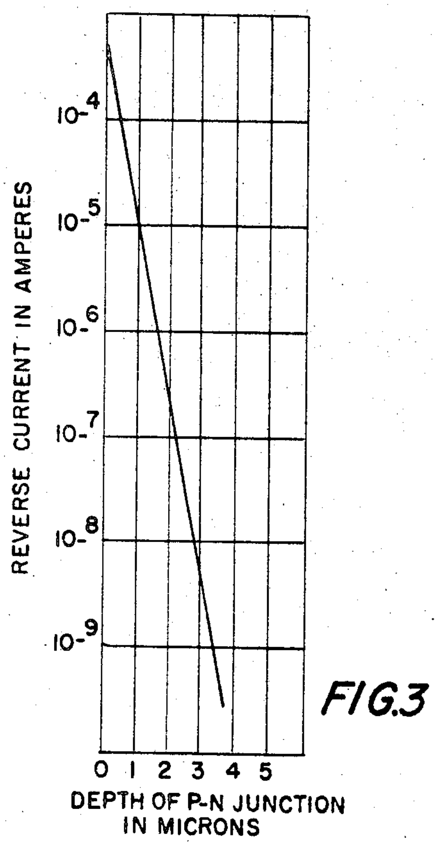
FIG. 3 is a graph of reverse current change versus junction depths when the junction is maintained at a fixed voltage and under constant applied force.

The crystals used in the experiments leading to the curves reproduced in FIGS. 2–4 were obtained from a P-type crystal pulled in the (111) direction. The crystal slice selected for use was then treated to result in a conventional P–N junction, either by diffusion or alloying, at a depth lying below the surface of only approximately 0.0002 inch. The stylus used to introduce the anisotropic stress to the junction had a point whose radius of curvature was approximately 17 microns or 0.00075 inch. Such a point may be found on common phonograph needles.

It was found that when such a stylus is brought to bear on the semiconductor surface closest to the junction and perpendicular to the plane of the junction, lying slightly below the surface, the needle produces anisotropic stress over small areas of the junction of the semiconductor, when the needle is subjected to forces such as, for example, pressure, torsion, shear or other mechanical, electrical or magnetic forces. This results in reversible changes in the current-voltage relationships, or reactance, of a magnitude not previously observed. The results found by the experiment described above are shown in FIGS. 2, 3 and 4, as described hereinafter.

An important aspect of this invention resides in the depth at which the junction lies below the surface since it has been found that when the junction lies at depths of 0.010 inch or greater below the surface the effects described can not be detected by the described stylus. However, experiment has also shown that it is necessary that the stress be highly concentrated in a small volume of the junction such as occurs, for example, when the point of a needle as described above is used. Points of greater radius of curvature can be utilized but as the radius increases it has been found that the sensitivity of the device decreases. It has been found that when the radius of curvature becomes greater than 250 microns the observed effect becomes negligible and no longer may be employed to produce a practical device. Thus, to practice this invention it is necessary that semiconductor crystals having junctions lying only slightly below the surface be used in conjunction with a small radius of curvature stressing device substantially smaller than the entire junction area. Junctions lying at the desired level may be readily found in present day so-called "mesa" transistors or in so-called "planar" diodes. The invention may also be practiced on the so-called thin-film amplifiers. The desired effect may be greatly enhanced by utilizing material which contains imperfections in the stressed region. These crystal imperfections may be made, for example, by introducing impurities such as oxygen atoms in the crystal lattice or by introducing imperfections such as dislocations.

It has also been found that a pressure bias of between 1000 and 3000 dynes applied to the junction greatly increases the observed effect. This pressure bias will vary with junction depth, stylus configurations, material, etc.

FIG. 2 shows a current-voltage curve of a device embodying the invention with various amounts of stress being applied. As shown in FIG. 2, curve A is the initial reverse current curve of a diode reverse biased with no stress being applied initially thereto. The curve changes reversibly with applied stress until as shown in FIG. 2, curve D, there is applied a force of 4 gram weights to stylus 24. Curve B is produced by subjecting the device to a force of 2 gram weights and curve C is produced by subjecting the device to a force of 3 gram weights. All the above effects have been found to be completely reversible. Upon reversal of the stress the device has the same characteristics as shown by curve A. These effects confirm that such a device is readily useful as a highly sensitive strain transducer.

Measurements were made on various samples, including diffused and alloyed junctions in Ge and Si. However, better reproducibility and stability were obtained when stress was applied directly to the semiconductor surface rather than to an alloy. The current levels were generally kept within a few hundred $\mu a$, a range within which any localized heating effects were found to be small. The outstanding common characteristic features was found to be a decrease in junction resistance with increasing stress at all bias levels, except for some anomalies in the breakdown region. FIGURE 2 shows, for example, reverse-bias I–V characteristics, with the applied force as a parameter. One typical device that exhibits the above curves may have therein a junction produced by diffusing Sb, with a surface concentration of about $3\times10^{17}$ cm.$^{-3}$, about 1.3$\mu$ deep into 0.2 ohm-cm. P-type Ge. The manner in which the I–V characteristics changed under stress (P) was, at least qualitatively, fairly typical of the response of most of the samples. At room temperature the curves could be fitted approximately by Equations 9 and 10.

$$\text{Region R1: } I=\sigma_1(P)V+I_1(P)\left(1-\exp\frac{-qV}{n_1(P)kT}\right) \quad (9a)$$

$$\text{Region R2: } I=I_2(P)\exp m(P)V \quad (9b)$$

$$\text{Region R3: } I=K(P)V\exp l(P) \quad (9c)$$

and the forward-bias characteristics by $$I=I_3(P)\exp\frac{qV}{n_2(P)kT} \quad (10)$$

Previously, a forward bias range near zero was represented by a linear term. However, the small difference between a linear and an exponential representation near zero bias may well be within experimental error. After an initial slow rise, the values of $I_1$, $I_2$ and $\sigma$ above 1500 dynes show an approximately exponential increase with force. $I_3$ is slightly larger than $I_1$ and follows the same relationship with force. In the range R2, $m\simeq3.1$ v.$^{-1}$ at $P=0$, and then assumes a value of about $1.9\pm0.1$ v.$^{-1}$ for all forces. The values of $n$, which have a tendency to rise with stress under reverse bias, and to remain essentially constant under forward bias, are listed in Table I which shows stress dependence of the parameters in Equations 9 and 10 for a germanium junction.

TABLE I

| Force (dynes) | 0 | 1,750 | 2,000 | 2,500 | 2,750 | 3,000 | 3,500 | 4,000 |
|---|---|---|---|---|---|---|---|---|
| $n_1$ | 1.14 | 1.03 | 1.01 | 1.13 | 1.14 | 1.09 | 1.66 | 1.8 |
| $n_2$ | 1.09 | 1.09 | 1.10 | 1.13 | 1.10 | 1.10 | 1.11 | 1.1 |

In many cases an apparent decrease in breakdown voltage with increasing stress was observed. At reverse currents of the order of three to five ma. under stress, negative resistance effects could be observed. The same type of junction with the surface concentration reduced by outdiffusion to about $8\times10^{16}$ cm.$^{-3}$, and with a junction depth of about 0.5$\mu$, displayed a considerably higher stress sensitivity.

The preceding results refer to diffused Ge junctions with an N-doped top layer. However, other Ge junctions with an alloyed P-type top layer subjected to stress gave qualitatively similar results. The sensitivity, under otherwise equal conditions, depended on the degree to which direct mechanical contact with the regrown region could be established by chemical or mechanical removal of the metallic layer.

In Si junctions, qualitatively similar response to stress was observed as that described above except, again, in the reverse breakdown region. For example, the ASE in a junction produced by diffusing B about 0.45$\mu$ deep in 3.5 ohm-cm. Si, the voltage at which the differential resistance decreases sharply is increased with increasing stress, in contrast with the previously shown breakdown characteristics of Ge junctions. Below breakdown the curves could be roughly fitted by Equations 9 and 10 with the parameters listed in Table II.

As compared with Ge, $I_1$, $I_3$, and $\sigma$ increase less with force, and the exponents $n$ and $m$ show larger changes.

TABLE II

| Force (dynes) | 0 | 2,600 | 4,000 | 4,600 | 5,100 |
|---|---|---|---|---|---|
| $I_1$ ($\times10^8$ amp) | 5.5 | 6.0 | 16.5 | 17.5 | 23 |
| $I_2$ ($\times10^7$ amp) | | 3.5 | 13.3 | 56 | 122 |
| $I_3$ ($\times10^8$ amp) | 4.2 | 2.44 | 30.8 | 31.3 | 35.4 |
| $\sigma$ ($\times10^7$ ohm$l^1$) | 0 | 1.0 | 3.67 | 4.87 | 6.0 |
| $n_1$ | 1.55 | 2.80 | 4.0 | 3.74 | 3.5 |
| m ($\times10^2$ v$^{-1}$) | | 1.91 | 1.72 | 1.70 | 1.63 |

Stress dependence of the parameters in Equations 9 and 10 for a Si junction.

The previous remarks with reference to alloyed Ge junctions were found to apply as well to alloyed Si junctions with a top N layer.

FIG. 3 shows the relationship of the current changes as a function of the distance that the junction 28 lies below the surface 29 when a constant voltage and constant force is applied to the surface 29 of a germanium crystal.

Samples were prepared with characteristics as nearly identical as possible, except for junction depth. A low resistivity P-type Ge slice was divided into four quadrants, each of which was diffused with Sb for different lengths of time. Thus junction depths of 0.78, 1.35, 2.98 and 3.28$\mu$ were obtained. From the diffused sections a total of 20 individual units were prepared with junction diameters of about 0.3 mm. Every unit was subjected to stress with 3500 dynes and the mean difference $\Delta$I measured between the currents under stress $I_p$ and the zero stress current $I_0$, at a reverse bias of 0.5 volt. The choice of $\Delta$I as parameter was arbitrary. The particular values of stress and bias were the result of a compromise with the aim to obtain large values of $\Delta$I by using a large stress well within the elastic range, and to operate below breakdown by using a small bias. The results of these measurements, given in FIG. 3, show an exponential increase of $\Delta$I with decreasing depth. The relationship indicated by FIG. 3 is different depending upon the material and crystal direction thereof and most certainly varies with the type of junction utilized. In other words, if the material utilized were silicon instead of germanium or if the crystal orientation of the junction plane were (100) instead of (111) or if the junction produced in the crystal were alloyed instead of diffused, then variations of the general relationship shown by FIG. 3 will occur.

For example, a number of samples were prepared by diffusing Sb about 1.5$\mu$ deep into P-type Ge slices in the (111), (110), and (100) crystal planes, respectively. The slices were cut from the same parent crystal with a dislocation density $<10^3$ cm.$^{-2}$. A total of nine samples representing each crystal orientation was measured at 0 and 3000 dynes under constant reverse bias of 1 volt. The average values of current change thus obtained are listed in Table III.

TABLE III.—REVERSE BIAS CURRENT DUE TO STRESS IN GE JUNCTIONS LOCATED IN DIFFERENT CRYSTAL PLANES

| Orientation | (111) | (110) | (100) |
|---|---|---|---|
| I ($\mu$a) | 4.5 | 1.3 | 0.14 |

FIGS. 4*a* and 4*b* show the voltage-current characteristics of a germanium diode changing in relation to the amount of force being applied thereto. FIG. 4*a* shows the voltage-current characteristics of a junction with no stress applied thereto, FIG. 4*b* shows the voltage-current characteristics of the same junction with a force of 10 grams applied to stylus 24.

FIG. 5 is a cross-sectional diagram of a transistor structure which may be used as a phonograph cartridge to produce a variable gain by varying the pressure and varying the nonuniform, concentrated, anisotropic stress on the emitter junction. In FIG. 5 there is shown a header 35 having an emitter lead 36 and a base lead 37 passing therethrough. Leads 36 and 37 are insulated from header 35 by an insulating medium such as glass 38 surrounding lead 36, and lead 37. Mounted on the uppermost portion of header 35 is a block of semiconductor material, designated generally as 40, which is similar to a standard mesa transistor and which contains therein a collector region 47 and a base region 42 with a collector-base junction 41 therebetween. A lead 42*a* connects region to external connection lead 37. In addition base region 42 is provided with an emitter junction 43 in a manner known to the art. From the region overlying junction 43 there is a lead 43*a* passing to external connecting lead 36. Suitably secured to header 35 by welding, for example, is can 44 whose upper end is made in the form of a compressible bellows which is normally in a partially compressed state, which carries a mechanism suitable for varying the nonuniform, anisotropic stress to be applied to the emitter junction 43 and which is depicted in FIG. 5 by a mechanism comprising a lever arm 49 pivotally mounted on member 50, which in turn is attached to the side of can 44 by bracket 51. One end of lever arm 49 is attached to the bellows end of can 44 and the other end attached to a phonograph needle 52. Disposed within can 44 is a stylus member 45.

When the phonograph needle 52 is introduced into the groove of a rotating phonograph record, not shown, a lateral motion, depicted by arrow 60, is imparted to the phonograph needle 52. This lateral motion is then translated by lever arm 49 so that a vertical motion is introduced in stylus 45 whereby the point of stylus 45 is brought to bear on the area overlapping the emitter junction causing the gain of the device to vary in proportion to the pressure applied. Thus described is a practical phonograph cartridge utilizing the invention. A change in characteristics achieved by such a method is depicted in FIGS. 7*a*, 7*b*, 7*c* and 7*d* as will be described hereinafter.

The device depicted in FIG. 5 may be pre-stressed by selection of the bellows mechanism and as such pre-stress is removed the junction characteristics will vary accordingly. Thus, the change indicated may be in either direction; that is, the change may be indicated either by an increase or a decrease in the value of the junction parameters.

It is obvious, of course, that the lever mechanism 49, shown in FIG. 5, may be easily replaced by a microphone, loud speaker or other acoustical or electrical device in order to convert any incoming signal into terms of pressure bearing on the P-N junction in the above-described manner.

Such a device can also be utilized as a three-terminal strain transducer with the collector or emitter, or both, subjected to one or two different strain inputs. In this way the transducer can be utilized as its own amplifier or impedance converter. Alternately the strain inputs can be used to modulate the generated signal if the device is electrically operated as an oscillator. Thus, obviously, such electrical and mechanical signals can be mixed in the described device; and since the devices can be made extremely small, light and sensitive to high frequencies, they will be useful for such applications as underwater signal detection or in any amplifying or oscillating system where such a transducer is needed.

FIG. 6 shows a device carrying substantially the same numeral designations as FIG. 5, which device is utilized as a temperature-compensated transistor. However, instead of having a compressible can, such as shown by 44 in FIG. 5 on header 35, there is provided instead a can 46 made of suitable material whereby as the environmental temperature surrounding the device varied, more or less pressure will be brought to bear on the region overlying junction 43 by stylus 47 so that the characteristics of the device will vary in accordance to the temperature to which the device is subjected. The curves of such a device are identical to those produced with the device depicted in FIG. 5 and are essentially the same as the curves shown in FIGS. 7*a* and 7*b*. It is obvious that other embodiments of the devices shown in FIGS. 5 and 6 will readily be apparent to persons skilled in the art. It is also apparent that such devices can readily be used to detect any type of sensitive pressure variation applied to the emitter junction in the manner previously set forth.

FIG. 7*a* shows the common emitter transfer characteristics of a mesa transistor without any stress applied to the emitter junction, and FIG. 7*b* shows the same mesa transistor with 3 grams of pressure applied to the stylus introducing anisotropic stress in the emitter junction.

FIG. 7*c* shows the common emitter current transfer characteristics of a silicon mesa transistor with the force of 1,000 dynes applied to the stylus and FIG. 7*d* shows the common emitter current transfer characteristics of a silicon mesa transistor with the force of 1,500 dynes applied to the stylus.

The ASE obviously manifests itself also in the operation of devices composed of two or more junctions. In transistors the ASE has, in particular, interesting practical implications and, while it represents a compound effect, its study does add useful information. Depending on the mechanical configuration, the stress distribution and, of course, the electrical parameters examined, various direct or indirect effects can be observed. It can readily be shown that stress, applied to the emitter junction, can cause a reduction of $\beta$, the common emitter transfer characteristic. This effect is displayed by Ge as well as by Si devices. The effect on silicon devices is shown in FIGS. 7*a*, *b*, *c* and *d*. The effect on germanium is shown in FIGS. 8*a*, *b* and *c*. It should be noted that in FIG. 7*b* current increases while in FIGS. 7*c* and *d* the current decreases. This characteristic of FIG. 7*b* appears to be an abnormality while FIGS. 7*c* and *d* appear to be the more typical cases for silicon. Such abnormal curves as shown in FIG. 7*b* have also been observed in germanium devices. The extremely large magnitude which this effect can have is illustrated in FIG. 9 where a reversible change in $\alpha$, the common base transfer characteristic, by a factor of nearly 1000 can be seen, when, for example, an N-P-N Si transistor is subjected to a force of 4000 dynes and a similar but smaller effect can be observed in a Ge P-N-P transistor. Decreases in $\alpha$ are also obtained when stress is applied to the emitter biased from a constant voltage source. As in the case of single junctions, depth, in this case that of the emitter junction, is found to strongly affect the magnitude of the effect. For example, while 1500 dynes on an emitter in Si a few tenths of a $\mu$ deep caused a change in $\beta$ by about one order of magnitude and a similar change in an about equally shallow Ge emitter junction, the same force applied to a Si emitter about $3\mu$ deep caused $\beta$ to change by only a few percent. While differences in materials probably account for some of this difference in the magnitude of the ASE, it appears that depth is the largest contributing factor. Also, as in the case of single junctions, stress sensitivity is low at small values of stress. $\alpha$ decreases by only about 5 percent over the range of 0 to 2000 dynes, and then it drops sharply between 2500 and 4000 dynes.

Forces of the order of 3000–4000 dynes, depending on the depth of the collector junction, had essentially no influence on the I–V characteristics of the transistor, except through the change in collected current. Forces larger than these, caused a compound effect due to a decrease in a collected current together with a decreased resistance of the collector junction. The latter component clearly manifested itself by the typical change in slope of the I–V characteristic when the emitter circuit was opened. Stress applied directly to the collector junction outside the region under the emitter, produced no change in current gain and only altered the collector junction resistance. If the polarity of the transistor was inverted and stress applied to what was then the collector junction, relatively small decreases in $\beta$ together with the strong resistance changes of the collector junction where observed, unless very large stresses were applied.

Occasionally, small stresses on the emitter junction resulted in relatively small increases of $\beta$ by factors up to about two. Further increases of stress in such cases usually caused $\beta$ to drop in the manner described above. It is possible that in these cases built-in stresses existed in the device which manifested themselves in combination with the externally applied stresses.

Preliminary measurements have also been made of the ASE in four-layer devices where it was found to cause significant changes in the switching characteristics.

In each of the above-described FIGS. 7*a, b, c* and *d,* the base current is in steps of 10 microamperes.

FIGS. 8*a, b,* and *c* show a similar set of collector characteristics for a P-N-P germanium mesa transistor.

The apparatus shown in FIG. 1 may also be utilized to determine the depth at which the junction lies below the surface. For example, if a known pressure is applied to stylus 24 and a flow of $4\times10^{-9}$ amperes of current were observed then it can readily be determined from FIG. 3 that the junction lies 3 microns below the surface 29.

Such an apparatus fills an obvious need for a simple, easy, inexpensive means of determining the depths of shallow junctions in semiconductor devices.

The ASE is an electromechanical effect of considerable magnitude and thus has obvious device potentialities. Transducers based on this effect can be of very small size and mass, are capable of operation over a wide frequency range including D-C, and have the advantage of the versatility inherent in multiterminal devices. Experimental devices fabricated so far incorporate basically the experimental arrangement schematically shown in FIG. 1, with suitable mechanical modifications. Preliminary evaluation has already demonstrated their usefulness as microphones, hydrophones, and phonograph pick-ups, and shows promise that the further potentialities can be realized in practice. For example, microphones about 6 mm. in diameter have provided outputs at resonance up to about 100 $\mu$w at sound levels of about 0.2 bar, with signal to noise ratios up to about 80 db. Other applications may be expected to include the sensing of forces, acceleration, displacement, etc. Using the conventional gage factor ($\Delta R/R/\Delta L/L$) as a figure of merit of an electromechanical transducer, and disregarding for the purpose of an estimate the stress anisotropy inherent in the ASE, and the diode and transistor characteristics shown, gage factors of $10^6$ or more should be possible with semiconductor blocks of the order of 1 mm. thick. This compares with gage factors of the order of 100–200 for conventional transducers.

In FIG. 15 there is shown an improved strain transducer utilizing the present invention. It has been found that in utilizing the device as shown in FIG. 1, for example, that slight lateral motion of the point along the surface due to misalignment or shock may destroy the transducer by leaving a permanent scratch on the semiconductor surface and thus cause permanent damage which tends to destroy the device.

The following simple expedient illustrated in FIG. 15 has been found to greatly reduce the tendency for this to occur. The simple expedient comprises producing a well-defined depression on the semiconductor surface lying closest to the junction and locating the point of the pressure stylus therein. The walls of this depression substantially reduce any tendency of the point to move in a lateral direction, thus preventing possible scratching or pitting of the surface, thereby eliminating deterioration in the performance of the device.

A semiconductor body generally designated by numeral 50 consists of an N-region 51 and a shallow P-region 52 having a P-N junction 53 lying therebetween. The body 50 is provided with a small but well-defined depression designated by numeral 54. Following the making of the depression in the body 50, P layer 52 is provided in the body 50 by any well known method such as diffusion. It has been found that such well-defined depressions can be accomplished very simply, for example by contact etching. This depression or concave region 54 provided in the body 50 significantly reduces the possibility of scratching of the surface due to slight lateral motion of the point or due to misalignment or shock. It has been found that a very slight decrease in sensitivity may occur due to the somewhat increased contact area between P layer 52 and stylus 55. However, such a decrease can be compensated for by a slight thinning of region 52 over that generally provided as described with FIG. 1 or by a slight sharpening of the radius of curvature of stylus 55. It should be noted that the P-N layers of the described device can be reversed.

FIG. 16*a* describes one step in the process of producing the complete device shown in FIG. 16*b* and relates to a method whereby the junction of the device used as the transducer, as described in FIG. 1, is easily restricted to the small active region underlying the anisotropic stress area and which comprises coating the stylus used to apply the stress with an etch-resistant material such as wax, positioning the stylus on the surface of the semiconductor body near an electrode maintained thereon, which electrode is preferably composed of a material such as gold or other noble metal which resists attack by the etching solution, heating the assembly until the wax flows and reaches the electrode, cooling the assembly to solidify the wax and etching the assembly to remove the unwanted semiconductor material and the junction thereunder.

In FIG. 16*a* a stylus 60 having a wax coating 61 thereon is positioned on the surface of a semiconductor body 62 having an N-region 63 and a P-region 64 therein. Lying between N-region 63 and P-region 64 is a P-N junction 65. Further provided on the surface 66 of body 62 is an electrode 67. This electrode 67 provides a means of electrical connection to P-region 64 while an electrode 68 provides a means of electrical connection to N-region 63. Preferably, electrode 67 and electrode 68 are composed of any noble metal such as gold or a base metal such as lead which is highly resistant to the usual etching solutions used in the semiconductor art. The stylus itself may be provided with a gold plate to also tend to reduce any possible deleterious effect due to the etching solution used in the fabrication. The device is now heated or otherwise treated in such a manner that the wax 61 melts and flows across surface 66 in all directions forming a wax-coated area on the surface 66 underlying stylus 60. At the same time, pressure is brought to bear on stylus 60 so it makes firm contact with surface 66 as shown in FIG. 16*b*. The wax 61 flows outwardly until it contacts electrode 67 and flows also on the other side of stylus 60 indicated by 61*a* in FIG. 16*b*. Following this treatment, the device is immersed in a standard etching bath well known to the semiconductor art so that the surface 66 is appreciably reduced in area by the removal of the corners of body 62 and a mesa-like construction is achieved as indicated in FIG. 16*b*.

FIGS. 17 and 18 show a further embodiment of the invention utilized as an accelerometer having three-dimensional resolution. This device is one that utilizes three mutually perpendicular P-N junction transducers indicated by numerals 70, 71 and 72 mounted so as to be held in contact with three points of an appropriately small spring-held ball 73. The radius of the ball is less than 250 microns to result in adequate sensitivity. The ball 73 can be made of any appropriate conducting or insulating material such as steel or sapphire. A component of acceleration in any of the three mutually perpendicular directions X, Y or Z, as indicated in FIG. 17, is detected by a change in previously described response of the appropriate individual P-N junctions 70, 71 or 72, respectively. The P-N junction transducers 70, 71 and 72 are generally of the type described in conjunction with FIG. 1. A helical spring 150 is attached to a point 151 on a suitable fixed support 152, the point 151 being diagonally opposite the corner formed by the three transducers 70, 71 and 72 to hold the ball 73 in its equilibrium position in the corner. Any acceleration applied to the device and consequently to ball 73 produces stress in the strain transducers 70, 71 and 72. Thus the three spatial components of the acceleration applied to ball 73 can be detected by the change in resistance of the individual transducers 70, 71 and 72. Each stress applied to the transducer is detected by means of lead-out electrodes 74 and 75 on transducer 70, electrodes 76 and 77 on transducer 71, and electrodes 78 and 79 on transducer 72, which may be connected to appropriate equipment. Since the masses of the individual transducers and of the ball in spring loading mechanism can be made very small the masses of the housing and the tension of the spring can also be chosen so that a large range of accelerations may be detected. There is thus provided an extremely highly sensitive three-dimensional accelerometer with high resolution it is, of course, necessary in each of the strain transducers described above, 70, 71 and 72 that shallow P-N junctions of the device contemplated and as described in FIG. 1 be used.

FIGS. 19, 20 and 21 depict embodiments of the invention utilized as push-pull, stacked cascaded transducers. These embodiments are directed to P-N junction strain transducers whose stylii are mechanically coupled so that a given mechanical signal is applied simultaneously to a plurality of transducers or selectively to one or more of said transducers in the group.

For example, FIG. 19 shows a push-pull structure of the invention and comprises a first semiconductor body 80 and a second semiconductor body 81, each of which contain the usual N and P regions and a P-N junction as described previously. Contained between the semiconductor bodies 80 and 81 is a double-ended stylus 82 which is maintained on the end of a cantilevered diaphragm 83. The cantilevered diaphragm 83 is firmly secured and mechanically supported at point 84 as indicated in FIG. 19. This structure permits a mechanical signal applied to diaphragm 83 to be detected by variations in the stress applied to surface 85 of body 81 or surface 86 of body 80 so that the signal applied to diaphragm 83 is detected by means of electrodes 87 and 88 of body 81 and electrodes 89 and 90 of body 80. This device provides a means whereby signal distortion is greatly reduced and signal input greatly increased.

FIG. 20 shows a second embodiment of a push-pull transducer utilizing a semiconductor body 91 which contains two P-regions 92 and 93 on either surface of body 91. These P-regions 92 and 93 are of shallow depth as previously described in conjunction with the present invention. In contact with surface 94 of region 93 is a stylus 95 securely attached to a mechanical structure 96. On surface 97 of region 92 is a second stylus 98 firmly secured to a flexible diaphragm 99 so that a force applied to diaphragm 99 may be detected in terms of the electrical response of the P-N junctions of the device by means of leads 100, 101 and 102 connected respectively to P-region 92, N-region 103 and P-region 93. Both the devices shown in FIG. 19 and FIG. 20 increase sensitivity, result in symmetrical electrical outputs and cancelling of some of the harmonics introduced by lack of linearity of response. Such arrangements as described in FIGS. 19 and 20 also permit electrical separation between the two output signals.

FIG. 21 shows a further extension of this arrangement and comprises cascaded semiconductor bodies 105 and 106, having contained therebetween a stylus 107 and a diaphragm 108 mounted on top of semiconductor body 105 with a stylus 109 connected to the diaphragm 108 and pressing on the surface of body 105 closest to the P-N junction contained therein. The advantage of such a cascaded or stacked transducer device is its capability to drive various independent circuits with one strain input. Moreover, since each transducer can be tailored to have different electrical characteristics and thus different electrical responses to the same amount of stress applied thereto, the impedances and magnitudes of the outputs of each transducer or semiconductor body can be tailored to specific requirements.

FIG. 22 sets forth a typical four-terminal semiconductor device having high input impedance and using the basic concept of this invention as described in conjunction with FIG. 1. This device essentially combines the strain effect of semiconductor devices as described in conjunction with FIG. 1 with electrostatic, piezoelectric or piezoresistive attraction. As shown in FIG. 22 the structure consists essentially of a capacitor to one plate of which a stylus is attached, which stylus is in contact with a semiconductor body containing a shallow P-N junction so that highly concentrated, non-uniform anisotropic stress can be applied to the device. Voltages applied between the plates of the capacitance cause alteration in the stress applied to the semiconductor body by the stylus.

FIG. 22 comprises a casing 121 which acts as one plate of a capacitor, which capacitor includes the casing 121, plate 122 and insulator or dielectric medium 123. A stylus 124 is mounted on plate 122 and presses against surface 125 of semiconductor body 126. The opposing surface of the semiconductor body preferably has a metallic contact 127 thereupon which, in turn, is contacted by a screw mechanism 128 insulated by a suitable insulating material 129 from case 121. Case 121 has an electrical lead 130, plate 122 has a lead 131 associated therewith, while P-region 132 has a lead 133, and N-region 134 of body 126 has a lead 135 associated therewith. Leads 130 and 131 act as the input of the device while leads 133 and 135 are connected tto an appropriate output circuit. A voltage applied between electrodes 130 and 131 causes a mutual attraction between plate 122 and header 121, causing the stylus 124 to tend to pull away from surface 125, thereby altering the stress upon the semiconductor device 126. The reduction in stress causes, as described in conjunction with FIG. 1, a resistance change in diode 126 or, more specifically, across the P-N junction contained therein, thus causing an output signal to appear across a suitable load resistor 136 which is located across leads 133 and 135.

The described device is extremely sensitive. For example to produce a change in stressing force of one dyne, only 1½ millivolts should be required as an input signal. It has been found, for example, that in devices described, for example, as in FIG. 1, a sensitivity of about only 4 millivolts per dyne can be obtained. Thus, the device described in FIG. 22 results in a threefold increase in gain. This high gain is obtained because of the high input impedance across capacitor plate 122 and casing 121.

By suitably reducing the dimensions of the entire device described in FIG. 22, the frequency response will extend up to the megacycle range. However, such an extension of the frequency range will reduce the amount of gain realized since the lateral extension of the input capacitor consisting of plate 122, insulator 123 and casing 121 is reduced. Generally, however, the device described in FIG. 22 achieves high input impedance and adjustable output impedances whereby the device can be utilized to provide input matching between tubes and semiconductor devices, for example in hybrid radio circuits.

The device further has significantly higher power gain than the previously-described devices and provides D-C insulation between the input and output circuits.

Further embodiments of this basic principle shown in FIG. 22, are readily apparent. For example, in place of diode 126 a transistor or other multiple junction structure as prevously described could be utilized, thereby providing multiple output circuits at various impedance levels. Other electromechanical or magneto phenomena such as piezo electricity or magnetostriction may be utilized to provide the stressing energy in place of the capacitor described. For example, a plane polarized piezoelectric ceramic disc will undergo a change in thickness when a voltage is applied. A mechanical coupling of the type described would then transmit the resultant force to the pressure-sensitive semiconductor device 126, thus causing a change in resistance and a signal at output terminals 133 and 135.

This device may be utilized in simple circuits such as wideband D-C transformers or power amplifiers, fixed switching relays and logical elements. When utilized as a wideband D-C transformer or power amplifier and where a piezolectric ceramic transducer is utilized in place of the capacitors described, a D-C to a 20 kilocycle bandwidth can be achieved. It is believed that operation to 100 kilocycles and higher is clearly within the capability of this device depending upon the ultimate size of the completed structure. Input impedances utilized in ceramic transducers will be typically $2\times10^{12}$ ohms shunted by 1000 picafarad. The output impedance of the device will, of course, be considerably lower and will depend primarily upon the junction characteristics and bias polarity of device 126. Since the input and output are D-C isolated from one another the device can readily be used as a relay and can be made to turn equipment on or off with either positive or negative input signals. The device can further be used as a memory element for logic circuits since the element, either capacitive or piezoelectric will retain its charge for an appreciable length of time. For example, using the input impedances and the capacitance mentioned above, time constants greater than ½ hour are readily realized.

Further, the device may be arranged to operate as a flip-flop since a pulse of opposite polarity will switch the output. Other obvious alternates to remove the fixed D-C component from the output would be by way of balance Wheatstone bridges wherein a semiconductor device 126 would be utilized as one arm. Other output configurations similar to those used in conventional transistor and vacuum circuits will suggest themselves to those skilled in the art. The device further can be utilized to operate with thermally actuated elements to allow either temperature sensing or temperature compensation, as described in FIG. 6 above.

It should be noted and obvious to one skilled in the art that the stylus used to apply anisotropic stress to the device can, of course, be used as an electrode in all described cases.

Anisotropic stress effect devices, as contrasted with conventional strain sensitive devices, are inherently characterized by the extremely small deformations required to produce large resistance changes. Also, anisotropic stress effect devices perform under D-C pressures. Thus, using the conventional structure of a small diamond stylus in contact with the semiconductor, extremely small distances could be measured. This follows from the following considerations. The elastic indentation $dx$ caused by a sphere on a plane is given by the expression $$dx=1.23R^{-1/3}(F/E)^{2/3}$$

where F is the applied force in dynes, R the radius of the sphere and E Young's modulus.

Assuming for Ge $E=1.5\times10^{12}$ dynes cm.$^{-2}$, and using as an example the typical values $R=20\mu$ and $F=3000$ dynes $$dx=0.156\mu$$

At the same time, under these conditions a reverse-biased diode will show a current change of the order of 1000 $\mu$a. Assuming, for the sake of an estimate, a linear response and a noise level of 1 $\mu$a., this means that distances of the order of 10 A. could be measured by means of this relatively simple and inexpensive device.

FIG. 23 shows a transistor device utilized as a microphone and comprises a metallic annular member 140 having restraining means such as a screw 141 appropriately positioned therein to hold a transistor header 142 securely in the annular opening provided in the bottom of member 140. Mounted on the uppermost surface of member 140, by means of a second restraining device such as screw 143, having positioned thereon a spring 144, is a glass plate 145, which has mounted thereon a stylus 146 which presses against, for example, the emitter junction of a semiconductor body 147, mounted on transistor header 142. The glass diaphragm 145 must, of course, be thin enough to respond to the compressive forces of audiocommunication. It is, of course, understood that the mechanical thickness and strength of diaphragm 145 may be readily calculated by one skilled in the art and that the thickness of this diaphragm is in direct proportion to the mechanical response of the device. The mechanical stresses applied through diaphragm 145 and stylus 146 to semiconductor body 147 are appropriately converted to electrical responses as indicated previously in FIG. 1 of the application.

FIG. 24 shows a device which provides for the application of overload to a semiconductor strain transducer of the type contemplated by this invention. The surface of a P-N-P transistor, designated generally as 180, is bevelled at a small angle, as shown in FIG. 24. A spring-loaded bar 181 presses against three spheres 182, 183 and 184 which puts these spheres in contact with the semiconductor body 180. Two of these spheres 182, 183 or 184 are at all times a relative distance from junction 185 or junction 186. Preferably, a thin oxide layer 187 is provided on surface 188 of body 180 in order to prevent shorting of the junctions 185 or 186. The resistance of junction 185 or 186 is varied by sliding plate 181 in a preset direction to determine the dynamic range and resolution of the device. Plate 181 is appropriately maintained by a mechanical structure consisting of spring 189, plate 160, spheres 161, 162 and 163 and body 164. In such a device by maintaining a constant pressure on body 180 through spheres 182, 183 and 184 by the mechanical structure previously indicated, any force applied to the device in a direction perpendicular to the surface 165 of body 180 causes the entire mechanical structure to slide along the bevelled surface 188 of body 180, and as the distance from the junction of the spheres 182, 183, and 184 varies, the resistance or reactive characteristics of the appropriate junctions also vary. The spheres keep friction at an insignificant level. The device provides a dynamic resistance range which is very large and which is adjustable by adjustments of the paths of the spheres.

FIG. 25*a* shows the paths for a semiconductor diode having one junction therein and FIG. 25*b* shows a transistor or three-level structure with a path therein. For example, in FIG. 25*a*, movement along path *a* gives the largest dynamic range of the device, the figure along path *b* gives an intermediate range, path *c* a small change for a given displacement, while path *d* results in a double-valued resistance function. In the transistor structure of FIG. 25*a* the path indicated causes the resistance of one junction for a given displacement to increase while the resistance of the other junction decreases. There is, of course, one position in which the resistance of both junctions are equal.

It should be thoroughly understood that there are many changes which may be made in the several figures shown in the drawings and described in the present specification. For example, whenever a device is shown utilizing a P-N junction it should be understood that other junctions such as an N-N+ or P-P+ junction may be substituted without deleterious effects. Further, for example, where a three-dimensional transducer is shown and described, as in FIG. 17, it is obvious that any multidimensional device can be made operable and that other mechanical mechanisms instead of balls or spheres can be used in such multidimensional devices. It should also be understood that wherever flexible diaphragms were described in illustrating the invention that these could be replaced by other flexible members or by mechanical members such as a cantilever arm. FIG. 22 shows an apparatus which can be made so that any means may be utilized in moving the plates toward or away from one another besides the described capacitive plates. For example, a magnetostrictive medium could be used as could other electromotive or electromechanical means.

This completes the description of the preferred embodiment of the invention. However, many modifications of the invention will be apparent to persons skilled in the art. Accordingly, it is desired that this invention not be limited except as defined by the appended claims.

What is claimed is:

1. A device comprising a body of semiconductor material having two adjacent regions of different conductivity types, one of said regions having a broad surface, barrier means between said regions for rectifying current flowing through at least a portion of said body, said barrier means being disposed in a plane parallel to said broad surface and spaced therefrom a slight distance by the region underlying said broad surface, means for producing concentrated, nonuniform, anisotropic stress in a small volume of said barrier means comprising a member having a small pointed tip engaging said one of said regions at said broad surface and movable in a direction toward and away from the barrier means for applying stress to the barrier means through said underlying region in a direction perpendicular to the plane of the barrier means, and means for applying a bias across said barrier means including a first ohmic contact to said one of said regions separate from said member, and a second ohmic contact to the remaining one of said regions.

2. A device as set forth in claim 1 wherein said regions are of P- and N-type conductivity respectively, and said barrier means is a P-N junction.

3. A device as set forth in claim 1 wherein said barrier means is disposed at a depth less than about 0.010 inch from said broad surface.

4. A device as set forth in claim 1 wherein the surface of said pointed tip which engages said broad surface has a radius of curvature less than about 250 microns.

5. The device of claim 1 wherein said body is composed of silicon.

6. The device of claim 1 wherein said body is composed of germanium.

7. The device of claim 1 wherein said body is composed of gallium arsenide.

8. A device as set forth in claim 1 wherein said body has intentionally introduced crystalline imperfections in the area thereof which is stressed for enhancing the response of the device.

9. A device in accordance with claim 8 wherein said crystalline imperfections comprise impurities disposed within the crystalline lattice structure of said material.

10. A device in accordance with claim 8 wherein said crystalline imperfections comprise dislocations in said crystalline material.

11. A multi-terminal transducer comprising a semiconductor device containing a plurality of alternating conductivity-type regions separated by P-N junctions, one of said regions having a broad exposed surface and at least a portion of one of said junctions being disposed in a plane parallel to said broad surface and spaced a slight distance therefrom by the region having the broad surface thereon, means for aplying a bias to said P-N junctions including ohmic contacts to each of said regions, and means for applying concentrated, nonuniform, anisotropic stress to a small volume of said one of said junctions comprising a separate member having a small pointed tip engaging said one of said regions at said broad surface and movable in a direction toward and away from said one of said junctions for applying stress thereto in a direction perpendicular to the plane thereof.

12. A device comprising a body of semiconductor material having two adjacent regions of different conductivity types, one of said regions having a broad surface, barrier means between said regions for rectifying current flowing through said body, the major portion of said barrier means extending in a plane parallel to said broad surface and spaced a slight distance therefrom by the region underlying said broad surface, said broad surface containing a depressed region, said barrier means remaining spaced said slight distance from said depressed region, means for producing anisotropic stress in a small volume of said barrier means, said stressing means comprising a member having a pointed tip engaging said depressed region and movable in a direction toward and away from said barrier means for applying stress to a small volume of the barrier means in a direction perpendicular to the plane thereof, and means for applying a bias across said barrier means including a first ohmic contact to said one of said spaced regions separate from said member, and a second ohmic contact to the remaining one of said regions.

13. A device comprising a mesa transistor having an emitter region, a base region, and a collector region, an emitter-base junction between said emitter and base regions, and a collector-base junction between said collector and base regions, said emitter region having a broad surface, said emitter-base junction being spaced from said broad surface a slight distance by the emitter region and having a minor portion thereof which lies in a plane parallel with at least a portion of said broad surface, means for biasing the emitter-base junction including ohmic contacts to each of said emitter and base regions, and separate means for producing concentrated, nonuniform, anisotropic stress in a small volume of said emitter-base junction comprising a separate member having a small pointed tip engaging said broad surface and movable in a direction toward and away from the emitter-base junction for applying stress to the emitter-base junction in a direction perpendicular to the plane of said portion thereof which lies parallel with at least a portion of said broad surface.

References Cited

UNITED STATES PATENTS

| | | | |
|---|---|---|---|
| 2,469,569 | 5/1949 | Ohl | 331—107 |
| 2,504,628 | 3/1950 | Benzer | 317—239 |
| 2,505,633 | 3/1950 | Whaley | 148—1.5 |
| 2,713,132 | 7/1955 | Matthews et al. | 317—236 |
| 3,161,810 | 12/1964 | Broussard | 317—234 |
| 3,182,492 | 5/1965 | Sikorski | 73—88.5 |
| 2,632,062 | 3/1953 | Montgomery | 317—235 |
| 2,929,885 | 3/1960 | Mueller | 317—235 |
| 3,049,685 | 8/1962 | Wright | 317—235 |

OTHER REFERENCES

Bell Laboratories Record, December 1962, pp. 418–419.

Rogers, Edward S.: "Experimental Tunnel-Diode Electromechanical Transducer Elements and Their Use in Tunnel-Diode Microphones," The Journal of the Acoustical Society of America, vol. 34, No. 7, July 1962, pp. 883–893.

JOHN W. HUCKERT, *Primary Examiner.*

J. R. SHEWMAKER, *Assistant Examiner.*